United States Patent
Yan

(10) Patent No.: US 11,132,764 B2
(45) Date of Patent: Sep. 28, 2021

(54) PANORAMA SKY USING GRID CAPTURE

(71) Applicant: Weather Intelligence Technology, Inc., Burlingame, CA (US)

(72) Inventor: Simeng Yan, Burlingame, CA (US)

(73) Assignee: TIANJIN KANTIAN TECHNOLOGY CO., LTD., Tianjin (CN)

( * ) Notice: Subject to any disclaimer, the term of this patent is extended or adjusted under 35 U.S.C. 154(b) by 212 days.

(21) Appl. No.: 16/452,548

(22) Filed: Jun. 26, 2019

(65) Prior Publication Data

US 2020/0410640 A1      Dec. 31, 2020

(51) Int. Cl.
*G06T 3/40*     (2006.01)
*G06N 20/00*    (2019.01)
*G01W 1/10*     (2006.01)

(52) U.S. Cl.
CPC ............ *G06T 3/4038* (2013.01); *G01W 1/10* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 2003/0206182 A1* | 11/2003 | Kelly | H04N 5/44513 345/632 |
| 2015/0212236 A1* | 7/2015 | Haas | G06T 7/337 382/100 |
| 2018/0372914 A1* | 12/2018 | Yan | G06F 30/20 |

* cited by examiner

*Primary Examiner* — Roy Y Yi
(74) *Attorney, Agent, or Firm* — Kilpatrick Townsend & Stockton LLP

(57) ABSTRACT

Embodiments can facilitate performing a localized weather analysis for a portion of a sky. For achieving this, optical sensors can be placed in a capture grid network to capture images of the sky portion. The capture grid network may be logically divided into grids. The images captured by the optical sensors may include meta information indicating time and locations on the capture grid network the images were captured. The images can be combined to obtain wide-view images for the sky portion at various points of time. The wide-view images can be used to perform weather analysis such as cloud analysis.

18 Claims, 6 Drawing Sheets

Given APOV is in the shape of 60° cone whose vertex is SKY camera
The height of the cone is H = 2000m
Sky coverage is the area of the bottom of the cone $S = \pi \times (H \div \sqrt{3})^2$
$S = 4km^2$

PANORAMA SKY USING GRID CAPTURE

FIELD OF THE INVENTION

The invention generally relates to capture a panorama sky image.

BACKGROUND OF THE INVENTION

Weather forecasting relates to predicting conditions of atmosphere for a given location and time. People have attempted to predict the weather informally for millennia and formally since the 19th century. Weather forecasts are made by collecting quantitative data about a current state of the atmosphere at a given place and using meteorology to project how the atmosphere will change.

Traditional weather forecasting typically relies on sophisticated weather models and data obtained through specialized equipment, such as weather satellites, large ground weather stations equipped with telescopes and large cameras, and the like. Traditional weather forecasting puts constraints on a granularity of a forecast report provided. The report typically will have to cover relatively widespread area such as a county, a city, or a zip code, due to the costs and sparsity of the traditional weather forecasting service providers. For example, it is nearly commercially unattainable for a traditional weather forecasting service to provide localized forecasting only focusing on a small area—for example for a crop field no more than 10 acres.

Another limitation associated with traditional weather forecasting is its accuracy or granularity of accuracy. In the case of weather satellites, granular accuracy is hard to achieve for obvious reasons. For the aforementioned large ground weather stations, they are typically spread miles apart at minimum. Coverage by these weather stations are typically at an area-level for accuracy. That is, while the traditional weather forecasting can predict weather changes for an area (e.g., a zipcode), it is hard for the traditional weather forecasting to predict weather changes for sub-areas or fields within that area, simply because weather condition changes are not tracked for these fields by the weather station. For example, while a traditional weather station can predict a general time (e.g., am/pm or at what hour during the day) of rain drop in an area, hence on a particular field in the area, it's hard for the weather station provide finer forecasting such as specific rain drop or wind change at an accuracy within seconds or minutes. However, such finer forecasting has been shown to be important for agriculture yields in modern day farming.

SUMMARY OF THE INVENTION

In accordance with the invention, embodiments can facilitate localized weather analysis using relatively inexpensive optical sensors. The localized weather analysis may cover real-time or near real-time weather changes for a small field in an area. The localized weather analysis may cover weather changes within second or minutes. For achieving this, the optical sensors are placed on a capture ground, or a capture gird network, to capture images of a particular sky portion corresponding to the capture grid network. The capture grid network may be logically divided into blocks or grids such that individual optical sensors can be placed on or in the grids and weather conditions may be mapped using such grids.

The so placed optical sensors can be configured to capture images of the sky portion from time to time and transmit the images to a computing device for further processing. The computing device can be configured to combine images captured at a given point of time to generate a wide-view of the sky portion at the given point of time. This wide-view image can be used to generate a profile of the sky, which may include cloud information regarding a cloud appearing in the sky portion at the specific time. Such a profile can be used to perform a weather analysis for the sky portion and hence a target ground field covered by the sky portion, for example through a cloud analysis at the specific time.

Other objects and advantages of the invention will be apparent to those skilled in the art based on the following drawings and detailed description.

DETAILED DESCRIPTION

Figure 1:
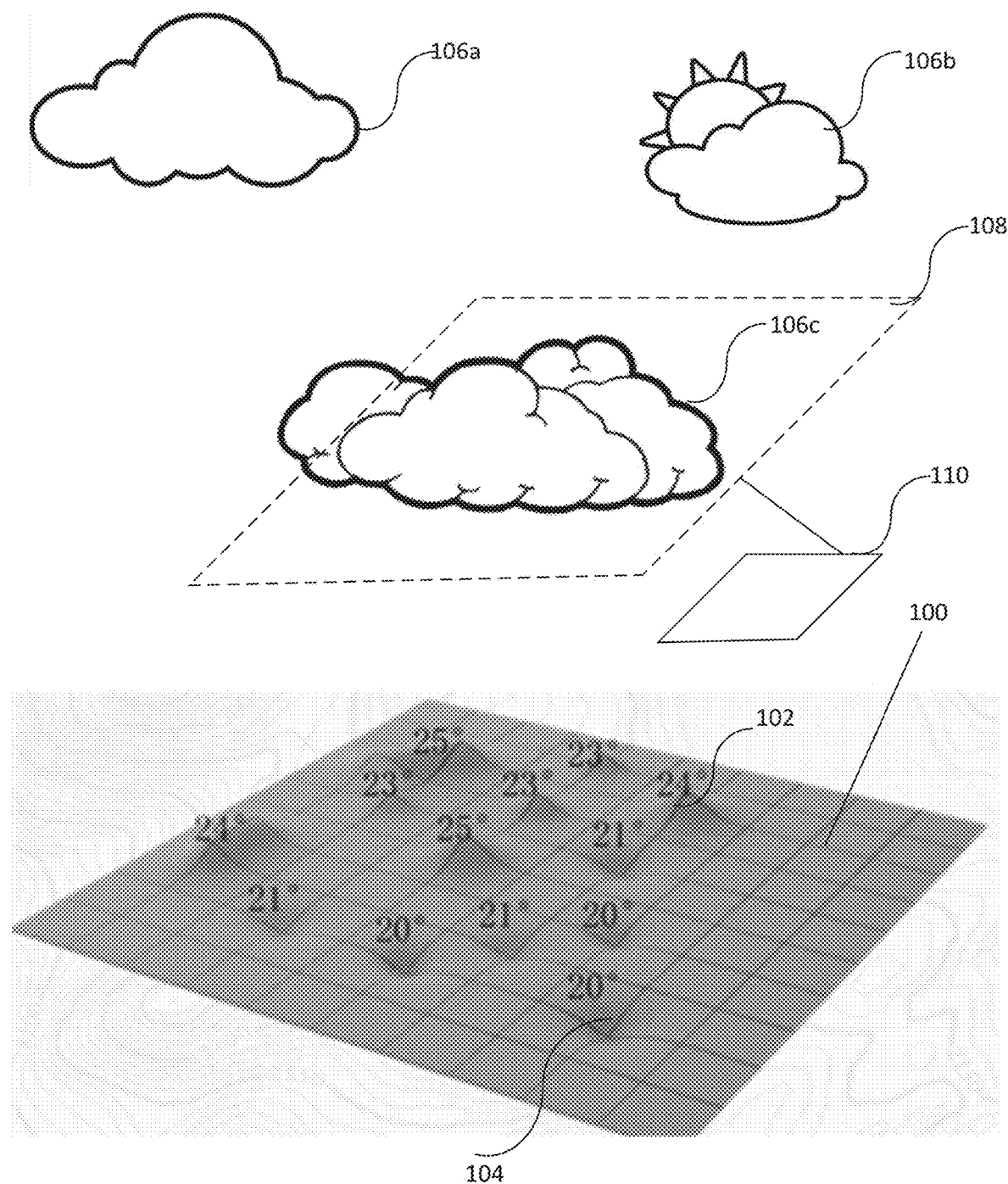
FIG. 1 illustrates an example of a capture grid network for capturing images of a sky in accordance with the disclosure.

Traditional techniques for capturing a sky image typically involve an optical sensor being positioned on a ground and pointing to the sky at a particular angle (e.g. straight upwards). A quality of a sky image captured by the traditional techniques largely depend on a quality of the optical sensors. For a high quality (i.e., high resolution and wide view) sky image, expensive cameras (equipped with special lens) are typically used, for example for weather analysis. Lower quality cameras are typically not suitable for capturing a sky image for weather analysis for they don't provide nearly the same quality as the more expensive cameras. This puts a limit or constraint for weather analysis to be carried out more wide-spread, not just by agencies or service providers that can afford expensive cameras.

One motivation behind the present disclosure is to facilitate capturing of a "good enough" sky image using relatively inexpensive optical sensors. By so capturing, the sky image should still provide sufficient resolution and view for a weather analysis to be carried out. The challenge for this is that an inexpensive optical sensor is typically limited in its field of view (FOV), frame rate, number of pixels captureable, light sensitivity, and many other parameters than can affect the quality of a sky image captured.

Taking FOV for example, due to size limitation, a smaller optical sensor typically has a smaller lens that limits the size of FOV of such an optical sensor. A sky image captured using such an optical sensor thus may be limited in terms of an area of sky view that can be captured. That is, only a small portion of the sky may be captured using such an optical sensor. A sky image captured by a single optical sensor is not sufficient for performing a comprehensive weather analysis.

An insight provided by the present disclosure for addressing the above-mentioned challenges is to use multiple optical sensors position on a ground field and pointing these optical sensors at the sky from their respective positions on the ground field to capture sky images in a coordinated manner. The captured sky images can be combined to obtain a wide-view of the sky or a panorama sky image at a given point of time. The wide-view image may contain information (such as cloud information) for the given point of time sufficient for performing a weather analysis (e.g., weather prediction in real time—next 5 minutes, etc.). This can help relieve constraints on the traditional weather analysis such that only a sophisticated weather agencies or service provider can provide weather analysis (e.g., weather forecast) for a wide area (e.g., for a city or county). Thus, this can help facilitate localized weather analysis for a relatively small field (for example, a corn field).

Another insight provided by the present disclosure is a concept of so-called hyperlocal weather grid, which defines an area on the ground for placing optical/image sensors. Such a grid may be referred to as a capture grid network herein. In essence, such a capture grid network can be used to define a network of lines that cross each other to form a series of squares or rectangles. On this grid, small (relatively speaking) optical sensors, such as the ones included in SKY weather stations can be affixed or placed at various points on the grid network. The placements of the optical sensors can be so arranged that a portion of the sky covering a target geographical area on the ground can be captured by these optical sensors in a coordinated manner. As used herein, such a target geographical area on the ground may be referred to as a target ground field of interest. Example of a target ground field of interest may include a corn (or any other agriculture yield) field, a grassland for herding domesticated animals, a flood zone, a natural reservation ground, just to name a few.

Capture Grid Network in General

FIG. 1 illustrates an example of a capture grid network 100 in accordance with the disclosure. As shown, the capture grid network 100 may be selected to correspond to a sky portion 108, which in turn may cover a target ground field of interest 110. The target ground of interest 110 may or may not overlap capture grid network 100 on the field. For example, in some situations, the capture grid network 100 may be a portion of target ground of interest 110. However, this is not necessarily the only case. In some situations, the capture grid network 100 may only partially overlap with the target ground of interest 110 geographically. In some other situations, the capture grid network 100 may not overlap with the target ground of interest 110. The geographical relationship between capture grid network 100 and target ground of interest 110 may depend on placements of the optical sensors on the capture grid network 100, such as placement density, pointing angels of individual optical sensors, and/or any other placement factors. For instance, in some situations placements of individual optical sensors may not be possible on the target ground of interest 110 (for example, target ground of interest 110 is a river or a natural reservation). In those situations, the capture grid network may have to be an area not overlapping with target ground of interest 110 at all, for example a ground next to the target ground of interest.

As can be seen, the capture grid network 100 may have various terrain features such as peaks 102 and valleys 104. Due to such terrain features on the capture grid network 100, care should be taken when placing optical sensors on the capture grid network 100. Generally speaking, optical sensors should be placed more or less at the same level on the capture grid network 100. However, this is not intended to be limiting. In some cases where the capture grid network 100 is not level, and/or where there are obstacles on the capture grid network, it is contemplated that the optical sensors may be placed at different levels.

As also can be seen, the sky portion 108 may comprise one or more clouds 106 such as 106c at a given point in time. The idea of the capture grid network 100 is to be able to capture images of, and hence monitor sky portion 108 consistently in time. That is, while it is hard to predict when and where the clouds 106a-c may appear in the sky and if at all it appears in the sky portion 108, that is not a chief concern for this disclosure. This disclosure introduces the capture grid network 100 for monitoring the sky portion 108, which can be determined and configured in advance (e.g., through help from an weather expert) covering the target ground of interest 110. Accordingly, the size and shape of the sky portion 108 hence may depend on the size and shape of the target ground of interest 110. That is, once the target ground of interest 110 can be determined, the sky portion 108 and capture grid network 100 can be determined.

It should be understood, although the capture grid network 100, sky portion 108 and target ground of interest 110 are all illustrated as having a rectangular shape in FIG. 1, this is not intended to be limiting. It is contemplated that in various implementations and embodiments of the present disclosure, shapes of these constructs can be different. For example, it is contemplated that target ground of interest 110 may have different shapes and sizes, and the shapes may be regular or irregular.

Figure 2:
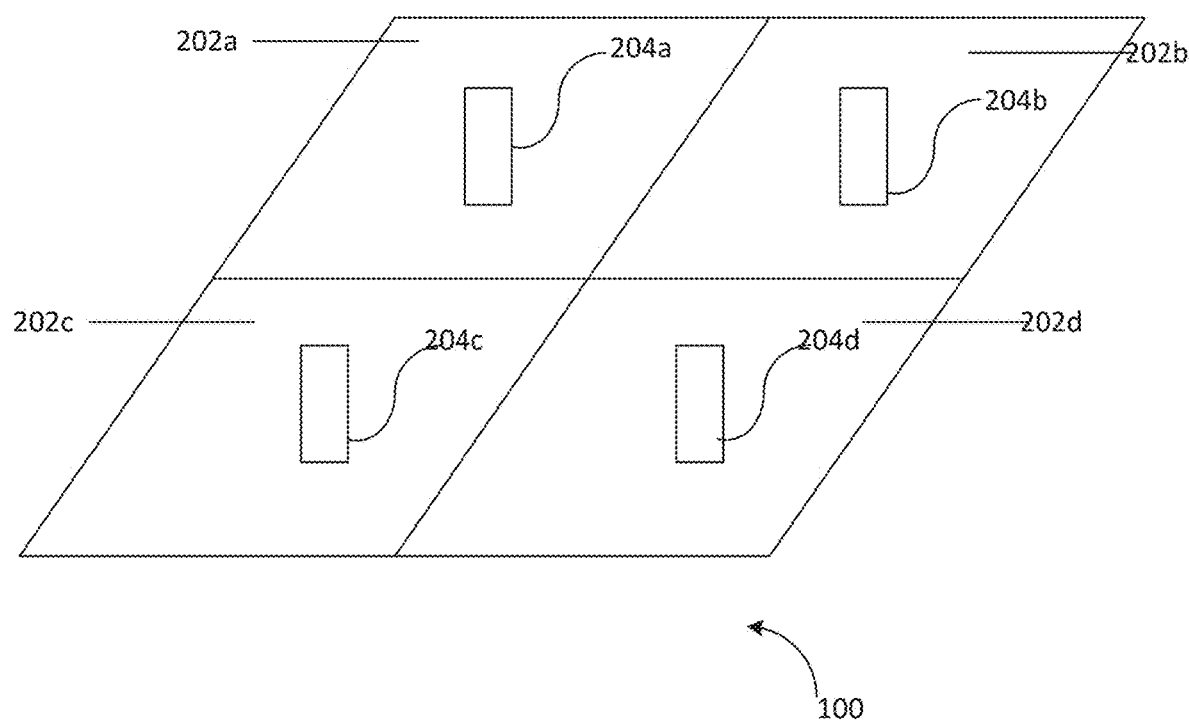
FIG. 2 illustrates some grids in a portion of the capture grid network shown in FIG. 1.

As mentioned above, for capturing images of the sky portion 108, capture grid network 100 may be logically divided into grids. FIG. 2 illustrates grids 202a-d in a portion of the capture grid network 100 shown in FIG. 1. In implementations, the sizes of the grids in the capture grid network 100 may depend on various factors such as the FOV size of individual optical sensors to be placed onto grids and a resolution of the sky image desired for sky portion 108. Generally, if the size of sky portion 108 is determined because of the target ground of interest 110 has been selected, the smaller size of the grid size, the more grids there may be in the capture grid network 100. This can facilitate capturing higher resolution of a sky image for the sky portion 108. Another advantage of a finer granularity of the grids in the capture grid network 100 is that the grids can create a coordinate system that may assist generating the wide-view sky image from individual images captured by individual optical sensors on the grids. Naturally, the finer such a coordinate system is the more flexibility it might provide for generating the wide-view sky image. However, on the other end, resolution of a the sky image of sky portion 108 need be only "good" enough for weather analysis desired for target ground of interest 110. Accordingly, there is no need, for example, to divide the capture grid network 100 into excessive number of grids capable of creating higher resolution of the sky image than necessary. Thus, the size of each individual grids and the number of total grids on the capture grid network 100 are largely a design choice depending on one or more factors suitable for the desired weather analysis. For example, certain type of weather analysis (such as predicting real-time weather change) needs more information in the sky portion 108 than other type of weather analysis (such as tracking cloud movements).

Also shown in FIG. 2 are individual optical sensors such as 204a-d. As shown, one or more of an optical sensor (e.g., 204a) may be placed within a given grid (e.g., 202a) in the capture grid network 100. It should be understood, the manner of placing the individual sensor 202a is not limited herein. For example, it is contemplated that the optical sensor 204a may be placed more or less at a center of grid 202a, or at any point in or on grid 202a. Also, an individual grid, such as grid 202a, may be placed with more than one optical sensors, and the number of optical sensors placed in different grids may vary. For example, by way of illustration, one optical sensor may be placed in grid 202a, two optical sensors may be placed in grid 202b, 5 optical sensors may be placed in grid 202c, and so on.

Optical Sensor Placement in the Grid Network

Referring back to FIG. 1, one important piece information in a sky image for weather analysis is cloud information regarding various aspects of a cloud in the sky at a given point in time. For performing a weather analysis meaningful to a target ground of interest 110, cloud information regarding cloud(s) 106 such as 106c appearing in the sky portion 108 is highly relevant. Thus, the optical sensors are desired to be placed on or in the grids of capture grid network 100 such that the cloud information may be extracted for the given point of time.

In general, for the purpose of performing localized weather analysis specific to target ground of interest 110, cloud(s) 106 appearing in the sky portion 108 may be divided into three categories: low clouds, middle clouds, and high clouds. Criteria for such division is not limited herein, but an example may be as follows: clouds below 6500 ft may be labeled as low clouds, clouds between 6500-23000 ft may be labeled as middle clouds, and clouds between 16500 and 45000 ft may be labeled as high clouds.

In photography, FOV is typically defined as a part of the world that is visible through the optical/image sensor at a particular position and orientation in space. Objects outside the FOV when the picture is taken are not recorded in the photograph. The FOV is most often expressed as the angular size of a view cone or as an angle of view. Angle of view (AOV) is a well-understood concept that describes an angular extent of a given scene that is imaged by an optical/image sensor.

Figure 3:
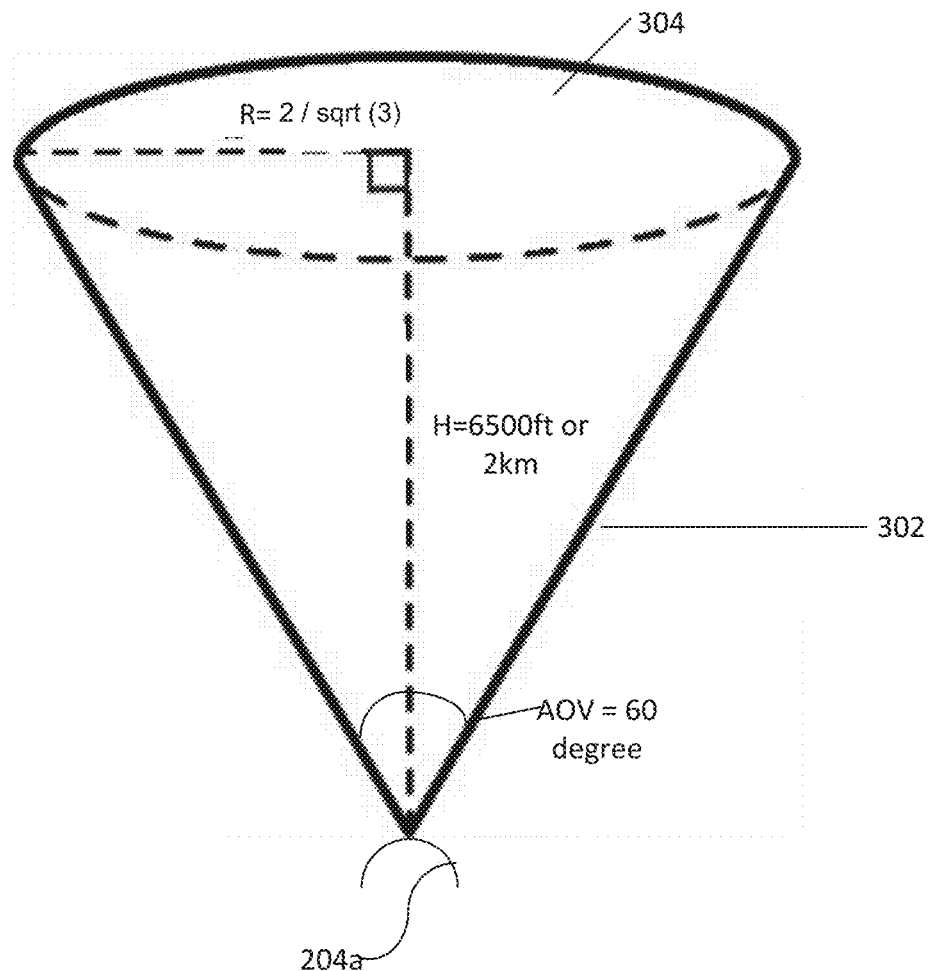
FIG. 3 illustrates an example for calculating a field of view for an optical sensor illustrated in FIG. 2.

With these, let's assume an AOV of an optical sensor, such as the one in Sky camera or Weather station, is 60 degree. An area in the sky that can be covered by such an optical sensor is 4 square kilometers for capturing low/middle clouds. Calculations for this coverage by such an optical sensor is provided in FIG. 3. As shown in FIG. 3, the optical sensor such as optical sensor 204a may have an AOV of 60 degree. Based on this AOV, as shown, a size of the view cone 302 that is desired for capturing low/middle clouds at 6500 feet can be calculated. The FOV in this calculation is the bottom surface 304 of the cone 302, which as shown is 4 square kilometers.

Given an area at a given altitude in the sky that can be covered by an individual optical sensor can be predetermined based an AOV of the optical sensor, a number of the optical sensors for covering the sky portion 108 can be determined. This determination may depend on individual sky coverage area per optical sensor, image quality requirement (such as the distortion rate of the images, especially on the edge of lens), and/or other considerations. Distribution of the optical sensors on the grids of capture grid network 100 (e.g., which locations on the capture grid network 100) can be determined based on the number of optical sensors determined. For example, if a target ground of interest is a rectangle having a size of 3 square kilometers, and the sky portion 108 to be monitored is a sky directly above it and the clouds of interest are be low-level clouds, 4 optical sensors may be placed on the capture grid network 100 for such a coverage.

Thus, based on a size of an area in the sky to be captured (or monitored) by the optical sensors, a quantity of the optical sensors can be determined for so capturing. Depending on various other factors, such as terrain features, terrain shape and size, and/or any other factors, actual placement of the optical sensors can be determined. In a simple case, where the capture grid network 1000 is relatively level across the entire capture grid network 100, the placement of cameras may be in a side-side configuration as shown in FIG. 2. However, it should be understood, such a configuration of the optical sensors may not be always the case. For example, these optical sensors may be configured or placed on the capture grid network 100 differently if there are surrounding obstacles in the capture grid network 1000 and/or the capture grid network 1000 is not level.

Wide-View Sky Image Generation for Weather Analysis

Images of a sky portion, such as the sky portion 108 shown in FIG. 1 can thus be captured by individual optical sensors positioned in respective locations/grids on the capture grid network 100. In implementations, individual optical sensors may be configured to capture a view of the sky portion 108 from the perspectives of the individual optical sensors. For example, optical sensor 204a may be configured to capture an image of the sky in a view measured by the bottom surface 304 of the cone 302 shown in FIG. 3. Such capturing by the individual optical sensors may be configured to take place at certain frequencies, for example once every 0.5, 1, 5, 10 minutes, 30 minutes, 60 minutes, 120 minutes, and so on. It should be understood that the individual optical sensors may be configured to capture the sky necessarily at the same time and at the same frequency. A higher frequency usually generates the sky images with the higher temporal resolution.

Each individual sky image captured by a given optical sensor, such as optical sensor 204a, may have meta information regarding the sky image. For example, such meta information may include a timestamp of the capturing and a location on a grid where the optical sensor 204a is placed and thus where the sky image is captured. Such images can be transmitted to a computing device for storage and further processing.

Figure 4:
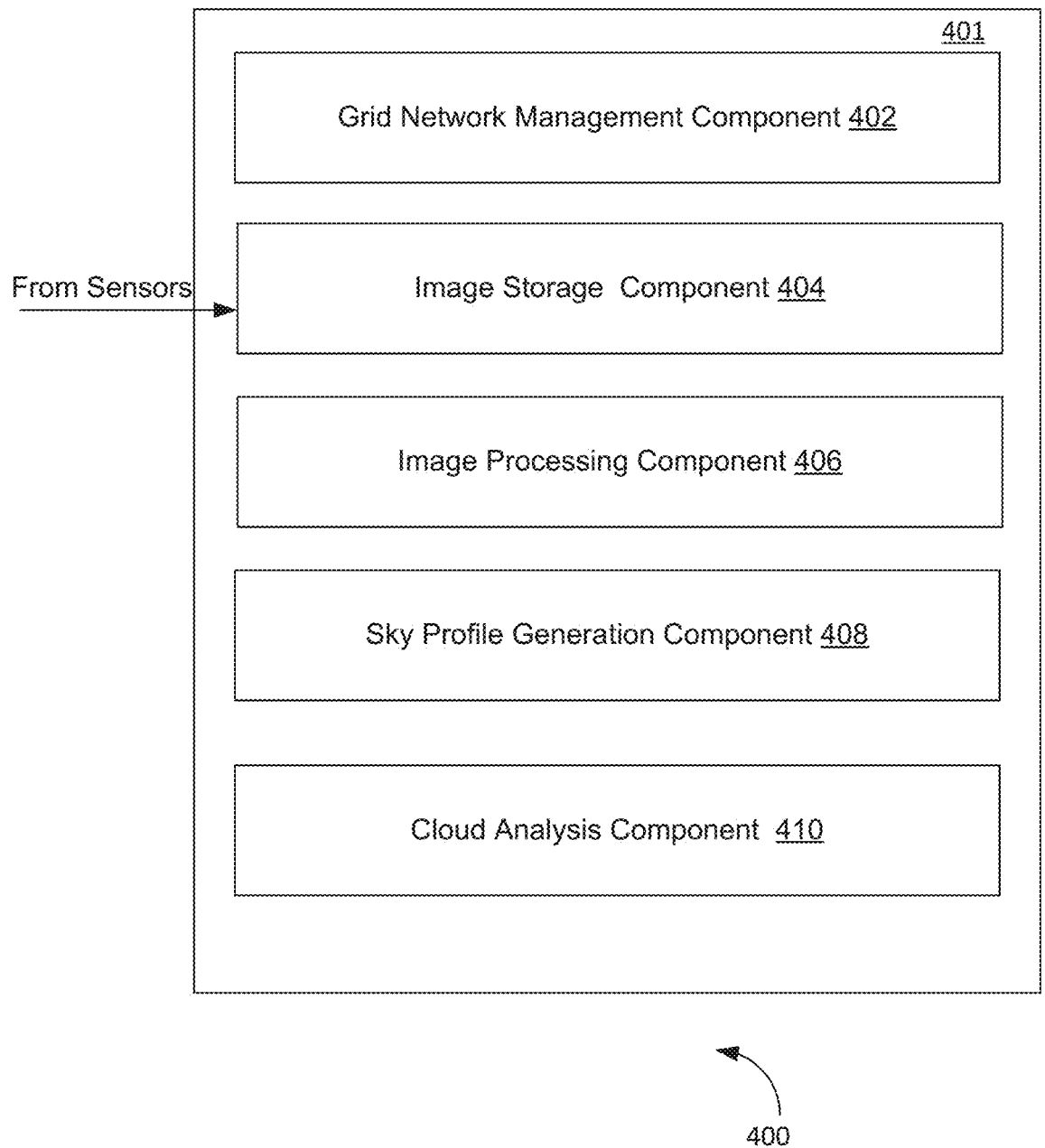
FIG. 4 illustrates a computing device configured for generating a wide-view sky image of a sky portion such as the sky portion shown in FIG. 1.

FIG. 4 illustrates a computing device 400 configured for generating a wide-view sky image of a sky portion such as the sky portion 108 shown in FIG. 1. As shown, the computing device 400 may comprise one or more of a processor 401 configured to execute program components, which can include a grid network management component 402, an image storage component 404, an image processing component 406, a sky profile generation component 408, a cloud analysis component 410, and/or any other components.

The grid network management component 402 can be configured to manage one or more of a capture gird network such as the capture grid network 100 shown in FIG. 1. Management by the grid network management component 402 may include managing a set of associations among sky portions, and target ground of interest and capture grid networks corresponding to the sky portions. For example, the association among the sky portion 108, capture grid network 100, and the target ground of interest 110 can be stored, for example in a table in a database associated with the computing device 400. Multiple of such an associations may be stored such a table. Each association may be assigned a unique ID for identifying the sky portion 108, capture grid network 100 and/or the target ground of interest 110.

In some embodiments, the grid network management component 402 may be configured to manage information regarding a given capture grid network 100. Such information may include various configurations regarding the capture grid network 100, such as a geolocation of the capture grid network 100, one or more boundaries of the capture grid network 100, a quantity of grids on the capture grid network 100, placements of individual optical sensors on the grids, geographical features associated with each grid (e.g., average altitude of the grid, landscape of the grid, and the like). Such information may be stored in a table (or tables) separate from the association table mentioned above.

The image storage component 404 may be configured to receive sky images captured by individual optical sensors placed on the capture grid networks, such as the capture grid network 100. A given sky image received by the image storage component 404 may include metadata information including information indicating an identification of the capture grid network where the image was captured, a location (or identification of a grid) on the capture grid network where the image was captured, a time when the image was captured, and/or any other information.

The image storage component 404 may be configured to store the given sky image captured by the give optical sensor into a storage associated with the computing device 400. Such a storage may include a memory, a hard disk, a database, and/or any other type of storage associated with the computing device. This may involve obtaining identification of the capture grid network from the image metadata information and store the image in association with the capture grid network based on the identification. This may involve identifying a location/grid on the capture grid network 100 the image was captured. This may involve obtaining the timestamp of the image and store the image in a time series with other images captured by this optical sensor and/or other optical sensors.

The image processing component 406 can be configured to combine the images captured by the optical sensors to generate wide-view sky images. This may involve receiving a command or instruction indicating a point of time and a sky portion for which a wide-view sky image is desired. For example, by way of illustration, the instruction may indicate a specific time (e.g. 6:03 pm this evening), and a center location of a sky, a shape and a size of the sky centering on this location. Such an instruction can thus specify a sky portion such as the sky portion 108 shown in FIG. 1, and a time when a wide-view image of this sky portion is desired.

In implementations, such an instruction may be received through an interface that enables a human programmer or administrator to provide such an instruction. However, this is not necessarily the only case. In some embodiments, it is contemplated such an instruction may be automatically generated by a program (such as a weather analysis program) from time to time. For example, the weather analysis program may be configured to perform weather analysis for the sky portion 108 every hour based on wide-view images of the sky portion 108 captured every 30 minutes. In that example, instructions to for the image processing component 406 to generate the wide-view images for the sky portion 108 can be generated every 30 minutes.

The operations by the image processing component 406 may involve image stitching operations to combine related sky images captured by the optical sensors for a particular sky portion, such as the sky portion 108. Such stitching may involve retrieving relevant images from the storage and combining them according to geometrical relationships among them. For example, by way of illustration, for stitching a wide-view image of sky portion 108 at a given point of time, the image processing component 406 may first identify the capture gird network corresponding to the sky portion 108. As mentioned above, such an identification can be facilitated through the associations managed by the grid network management component 402. In this example, identification of the capture grid network 100 can be obtained as being corresponding to the sky portion 108.

Next, images captured by optical sensors placed on the capture grid network 100 at the given point of time can be retrieved. These images can then be analyzed based on their locations of capture on the capture grid network 100. Geometric relationships about these images can then be acquired. Based on the geometric relationships, the images can then be combined to obtain a wide-view image of the sky portion 108 at the given point of time. For example, the analysis can involve feature detection in these images. One or more features in these images may be detected. The detected feature(s) can be then be compared for generating geometric relationship(s) between the images. For instance, if one feature is detected for two of these images, then these two images can be combined based on the location of the feature appearing in each of the two images, the locations of the capturing optical sensors in the capture grid network 100, and/or any other factors.

The sky profile generation component 408 can be configured to create a profile of the sky based on one or more of the wide-view sky images generated by the image processing component 406. A profile of the sky may comprise information regarding one or more clouds appearing in a sky portion at a specific time. Generating such a profile may involve identifying the one or more clouds from the one or more of the wide-view sky images, obtaining relevant cloud information such as the altitude(s) of the one or more clouds, a quantity of the one or more clouds, shape and size associated with the one or more clouds, a color of the one or more clouds, and/or any other cloud information. Such information may be synthesized in a specific format for the sky profile.

As illustration, for example, profile generation performed by the sky profile generation component 408 can involve determining a size of a cloud appearing in the sky portion 108 for generating the profile. For instance, if the sky portion 108 has a size of 4 square kilometers, cloud information for cloud appearing in the center 2 square kilometers may be analyzed.

The cloud analysis component 410 may be configured to perform cloud analysis based on one or more profiles generated by the sky profile generation component 408. This may involve retrieving the one or more profiles and extract cloud information from the one or more profiles. Based on the cloud information, various types of cloud analysis may be performed. For example, cloud tracking may be performed to obtain a movement of the one or more clouds within a period of time. As another example, types of the one or more clouds may be identified based on their shapes and sizes within a period of time.

Following is an example of cloud analysis, which can be performed by computing device 400, to track cloud movement between time $T_0$ and $T_1$ in a particular sky portion, such as sky portion 108.

1. An instruction is received to obtain a wide-view image for sky portion 108 at time $T_0$ and $T_1$. This can be performed by the image processing component 406.

2. Images captured, at $T_0$ and $T_1$, by the optical sensors, such as sensors 204a-d, placed on the capture grid network 100 can be obtained. This can be performed by image processing component 406 with help of grid network management component 402 and the image storage component 404.
3. The obtained images can be combined to create a wide-view images for sky portion 108 at $T_0$ and $T_1$. This can be performed by the image processing component 406.
4. The obtained wide-view images can be analyzed to identify a cloud locations $P_0$ and $P_1$ for a cloud identified to be in the wide-view images. This can be performed by sky profile generation component 408.
5. A height can be estimated for the cloud. This can be performed by sky profile generation component 408.
6. Taking the camera physical locations into account, the relative cloud positions in wide-view images can be mapped to its geolocations $F(P_0)$ and $F(P_1)$. F is a mapping function. This can be performed by cloud analysis component 410.
7. A geo-distance S for the cloud movement can be computed as follows: $S=|F(P_1)-F(P_0)|$
8. A velocity V for the cloud can be computed as follows: $V=S/(T_1-T_0)$. This can be performed by cloud analysis component 410.

Figure 5:
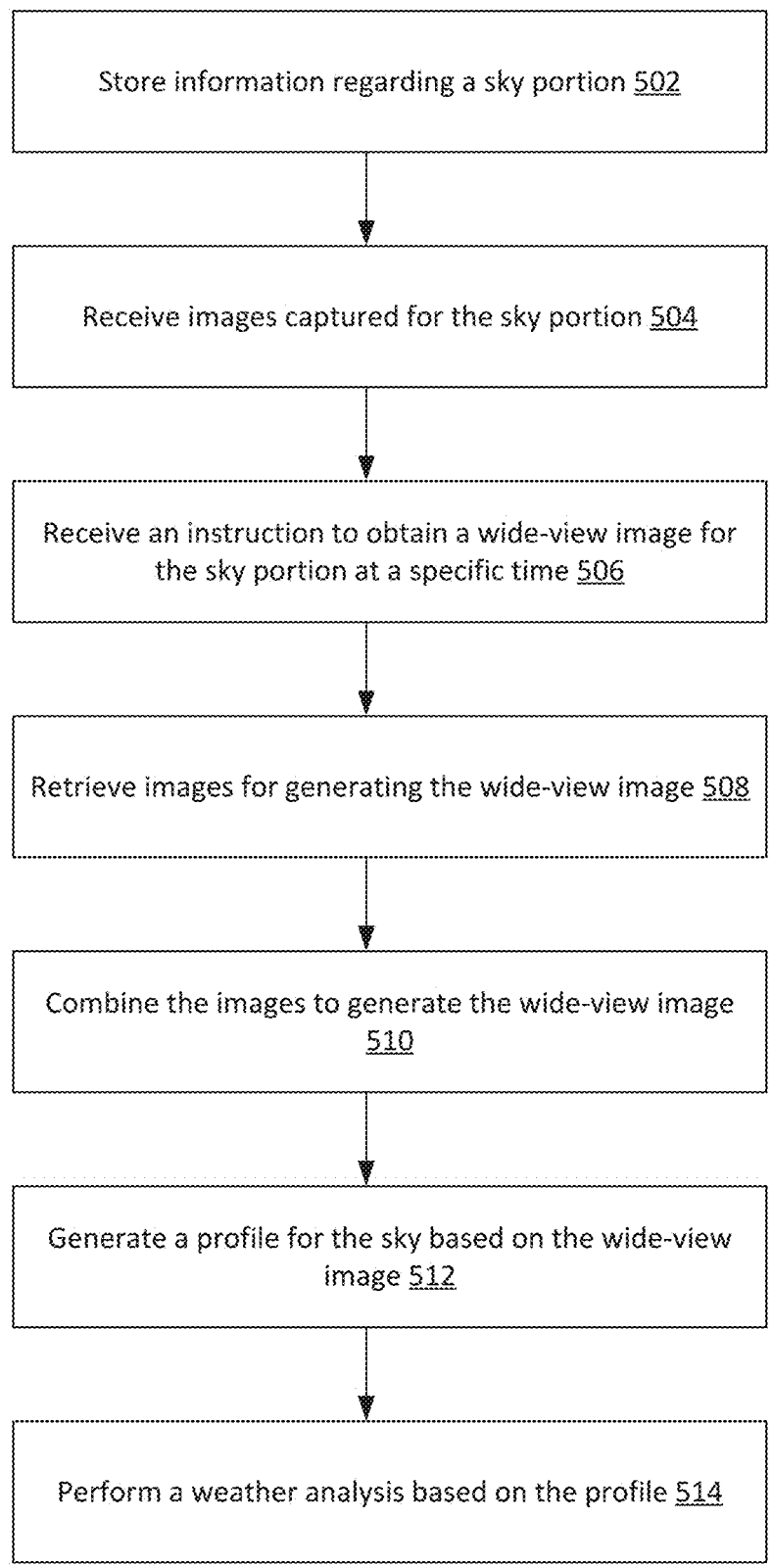
FIG. 5 is a flow diagram illustrating an exemplary method 500 for facilitate performing a weather analysis for a sky portion using a wide-view image of the sky portion in accordance with the disclosure.

FIG. 5 is a flow diagram illustrating an exemplary method 500 for facilitate performing a weather analysis for a sky portion using a wide-view image of the sky portion in accordance with the disclosure. It will be described with reference to FIGS. 1-4. The operations of method 500 presented below are intended to be illustrative. In some embodiments, method 500 may be accomplished with one or more additional operations not described and/or without one or more of the operations discussed. Additionally, the order in which the operations of method 500 are illustrated in FIG. 5 and described below is not intended to be limiting.

In some embodiments, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, information regarding a sky portion of interest, such as the sky portion 108 shown in FIG. 1 can be stored. As mentioned above, such information may indicating associations among the sky portion of interest, and a capture grid network and a target ground of interest corresponding to the sky portion of interest. In implementations, operations involved in 502 may include storing information regarding the capture grid network corresponding to the sky portion of interest, such as a quantity of optical sensors placed on the capture grid network, locations/grids where the optical sensors are placed on the capture grid network, a geolocation of the capture grid network, one or more terrain features of the capture grid network, and/or any other information regarding the capture grid network. In various implementations, operations performed at 502 can be implemented using a grid network management component the same as or substantially similar to grid network management component 402 described and illustrated herein.

At an operation 504, images captured by optical sensors placed on the capture grid network corresponding to the sky portion of interest, such as optical sensors 204a-d shown in FIG. 2 can be received. In various implementations, operations performed at 504 can be implemented using image storage component the same as or substantially similar to image storage component 404 described and illustrated herein.

At an operation 506, an instruction can be received to obtain a wide-view image for the sky portion of interest at a specific time. As described above, such an instruction may be received from an interface where a human is enabled to provide such an instruction, and/or received from a program such as weather analysis program that performs a weather analysis automatically. In some implementations, operation 506 may be performed by an image processing component the same as or substantially similar to the image processing component illustrated and described herein.

At an operation 508, images captured at the specific time for the sky portion of interest may be retrieved for generating the wide-view image. In some implementations, operation 508 may be performed by may be performed by an image processing component the same as or substantially similar to the image processing component illustrated and described herein.

At an operation 510, the images retrieved at 508 can be combined to obtain the wide-view image for the sky portion of interest as instructed. In some implementations, operation 510 may be performed by may be performed by an image processing component the same as or substantially similar to the image processing component illustrated and described herein.

Figure 6:
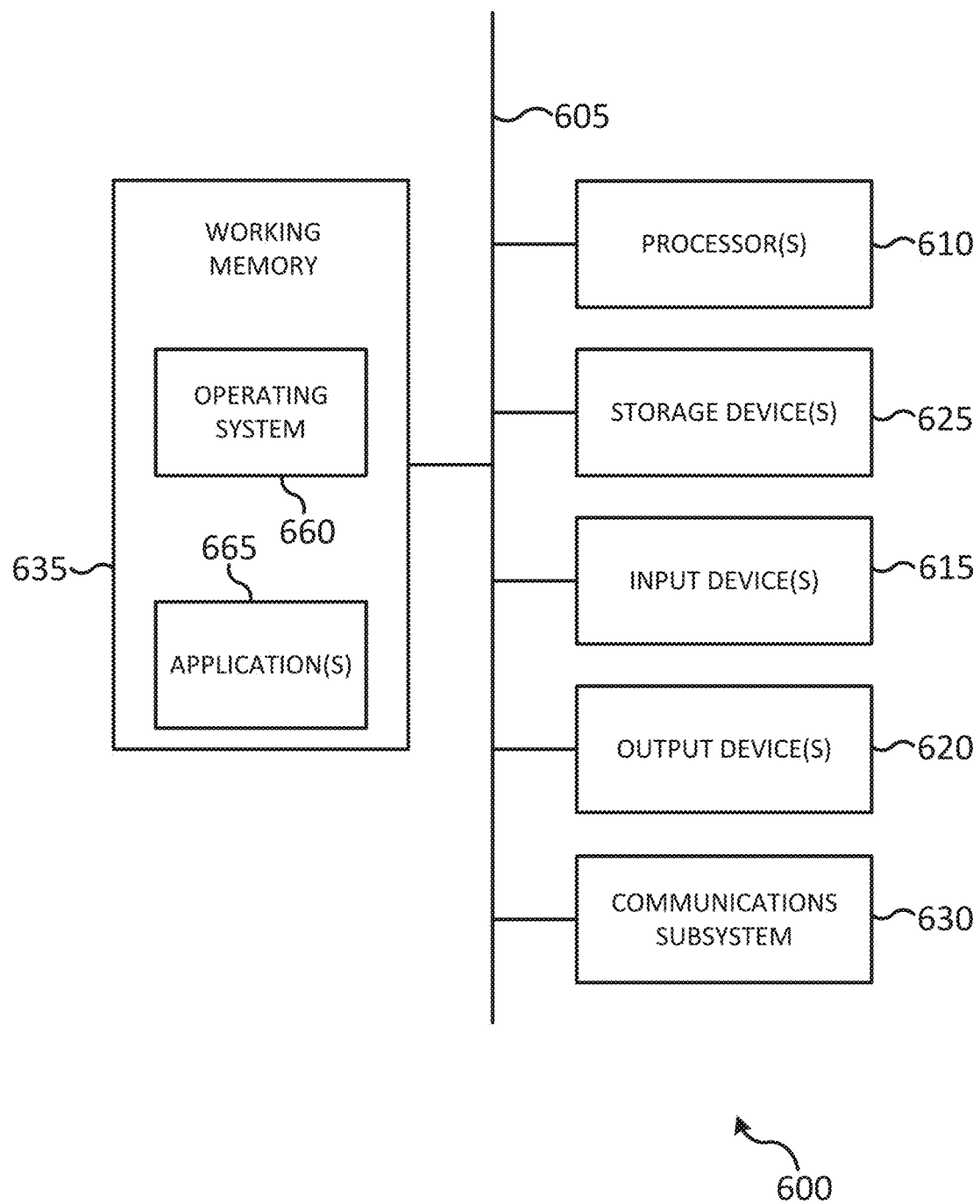
FIG. 6 illustrates a simplified computer system that can be used implement various embodiments described and illustrated herein.

At an operation 512, a profile can be generated for the sky based on the wide-view image generated at 510. As described herein, such a profile may include cloud information regarding a cloud appearing in the sky portion of interest at the specific time. In some implementations, operation 512 may be performed by may be performed by sky profile generation component the same as or substantially similar to sky profile generation component 408 illustrated and described herein At an operation 514, a weather analysis can be performed for the sky portion of interest using the profile generated at 512. The weather analysis performed at 514 may involve extracting cloud information from the profile and analyze the cloud information to obtain various characteristics about the cloud at specific time. In some implementations, operation 514 may be performed by may be performed by sky profile generation component the same as or substantially similar to sky profile generation component 408 illustrated and FIG. 6 illustrates a simplified computer system that can be used implement various embodiments described and illustrated herein. A computer system 600 as illustrated in FIG. 6 may be incorporated into devices such as a portable electronic device, mobile phone, or other device as described herein. FIG. 6 provides a schematic illustration of one embodiment of a computer system 600 that can perform some or all of the steps of the methods provided by various embodiments. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605, or may otherwise be in communication, as appropriate. The hardware elements may include one or more processors 610, including without limitation one or more general-purpose processors and/or one or more special-purpose processors such as digital signal processing chips, graphics acceleration processors, and/or the like; one or more input devices 615, which can include without limitation a mouse, a keyboard, a camera, and/or the like; and one or more output devices 620, which can include without limitation a display device, a printer, and/or the like.

The computer system 600 may further include and/or be in communication with one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device, and/or a chipset such as a Bluetooth™ device, an 602.11 device, a WiFi device, a WiMax device, cellular communication facilities, etc., and/or the like. The communications subsystem 630 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 630. In other embodiments, a portable electronic device, e.g. the first electronic device, may be incorporated into the computer system 600, e.g., an electronic device as an input device 615. In some embodiments, the computer system 600 will further comprise a working memory 635, which can include a RAM or ROM device, as described above.

The computer system 600 also can include software elements, shown as being currently located within the working memory 635, including an operating system 660, device drivers, executable libraries, and/or other code, such as one or more application programs 665, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 6, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 625 described above. In some cases, the storage medium might be incorporated within a computer system, such as computer system 600. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 600 to perform methods in accordance with various embodiments of the technology. According to a set of embodiments, some or all of the procedures of such methods are performed by the computer system 600 in response to processor 610 executing one or more sequences of one or more instructions, which might be incorporated into the operating system 660 and/or other code, such as an application program 665, contained in the working memory 635. Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor(s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 and/or components thereof generally will receive signals, and the bus 605 then might carry the signals and/or the data, instructions, etc. carried by the signals to the working memory 635, from which the processor(s) 610 retrieves and executes the instructions. The instructions received by the working memory 635 may optionally be stored on a non-transitory storage device 625 either before or after execution by the processor(s) 610.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method for performing a weather analysis using images of a sky, the method being implemented by a processor configured to execute machine-readable instructions, and the method comprising:
    storing information regarding a capture grid network corresponding to a continuous area of the sky, wherein the information indicates a quantity of grids in the capture grid network, locations of each of the grids in the capture grid network, a number of optical sensors configured in the capture grid network, and locations of the optical sensors are placed within the capture grid network, and wherein the capture grid network comprises a first optical sensor and a second optical sensor;
    obtaining from time to time images of the sky captured by the optical sensors, wherein the images includes meta information indicating capture time when the images are captured and locations on the capture grid network where the images are captured;
    receiving an instruction instructing generation of a view of the continuous area of the sky at a specific time;
    retrieving a set of images captured by the optical sensors at the specific time based on the capture time of the images in the set;
    combining the images in the set to obtain an image view of the continuous area of the sky, wherein the image view comprises at least a portion of a first image captured by the first optical sensor and a least a portion of a second image captured by the second optical sensor, both the first image and the second image being captured at the specific time;
    creating the profile of the sky using the image view of the continuous area of the sky at the specific time, wherein the profile of the sky includes cloud information regarding a cloud appearing in the continuous area of the sky at the specific time; and
    performing an weather analysis based on the profile of the sky.

2. The method of claim 1, wherein the configuration of the sensors in the capture grid network is based on at least one of: a field of view of each of the sensors, a height of the cloud, a shape of the continuous area of the sky over the field, a size of the continuous area of the sky over the field, or minimum image resolution for images.

3. The method of claim 1, wherein the configuration of the sensors includes configuring the sensors to obtain the images at a coordinated frequency.

4. The method of claim 1, wherein the configuration of the sensors includes a quantity of the sensors to be installed on capture grid network.

5. The method of claim 1, wherein a given grid in the capture grid network represents a portion of an area on the capture grid network, and wherein the grids in the capture grid network form a continuous area corresponding to the continuous area of the sky.

6. The method of claim 1, performing the weather analysis comprises: extracting the cloud information from the profile of the sky and analyzing the cloud at the given point of time.

7. The method of claim 6, wherein the cloud analysis includes recognizing a type of a cloud and/or tracking a movement of the cloud.

8. The method of claim 1, wherein the continuous area of the sky affects a weather condition for a target ground of interest, wherein the target ground of interest is separate and distinct from the capture grid network.

9. The method of claim 8, further comprising storing association information indicating the capture grid network is associated with the continuous area of the sky and association information indicating the continuous area of the sky is associated with the target ground of interest.

10. A computing device for performing a weather analysis using images of a sky, the computer device comprising a processor configured to execute machine-readable instructions such that when the machine-readable instructions are executed, the computing device are caused to perform:
    storing information regarding a capture grid network corresponding to a continuous area of the sky, wherein the information indicates a quantity of grids in the capture grid network, locations of each of the grids in the capture grid network, a number of optical sensors configured in the capture grid network, and locations of the optical sensors are placed within the capture grid network, and wherein the capture grid network comprises a first optical sensor and a second optical sensor;
    obtaining from time to time images of the sky captured by the optical sensors, wherein the images includes meta information indicating capture time when the images are captured and locations on the capture grid network where the images are captured;
    receiving an instruction instructing generation of a view of the continuous area of the sky at a specific time;
    retrieving a set of images captured by the optical sensors at the specific time based on the capture time of the images in the set;
    combining the images in the set to obtain an image view of the continuous area of the sky, wherein the image view comprises at least a portion of a first image captured by the first optical sensor and a least a portion of a second image captured by the second optical sensor, both the first image and the second image being captured at the specific time;
    creating the profile of the sky using the image view of the continuous area of the sky at the specific time, wherein the profile of the sky includes cloud information regarding a cloud appearing in the continuous area of the sky at the specific time; and
    performing an weather analysis based on the profile of the sky.

11. The computing device of claim 10, wherein the configuration of the sensors in the capture grid network is based on at least one of: a field of view of each of the sensors, a height of the cloud, a shape of the continuous area of the sky over the field, a size of the continuous area of the sky over the field, or minimum image resolution for images.

12. The computing device of claim 10, wherein the configuration of the sensors includes configuring the sensors to obtain the images at a coordinated frequency.

13. The computing device of claim 10, wherein the configuration of the sensors includes a quantity of the sensors to be installed on capture grid network.

14. The computing device of claim 10, wherein a given grid in the capture grid network represents a portion of an area on the capture grid network, and wherein the grids in the capture grid network form a continuous area corresponding to the continuous area of the sky.

15. The computing device of claim 10, wherein performing the weather analysis comprises: extracting the cloud information from the profile of the sky and analyzing the cloud at the given point of time.

16. The computing device of claim 15, wherein the cloud analysis includes recognizing a type of a cloud and/or tracking a movement of the cloud.

17. The computing device of claim 10, wherein the continuous area of the sky affects a weather condition for a target ground of interest, wherein the target ground of interest is separate and distinct from the capture grid network.

18. The method of claim 17, further comprising storing association information indicating the capture grid network is associated with the continuous area of the sky and association information indicating the continuous area of the sky is associated with the target ground of interest.

* * * * *